Oct. 3, 1950
A. W. HUTSON
2,524,260
MEANS FOR STORING, HANDLING, AND
TRANSPORTING MOTOR VEHICLES
Filed Nov. 4, 1947
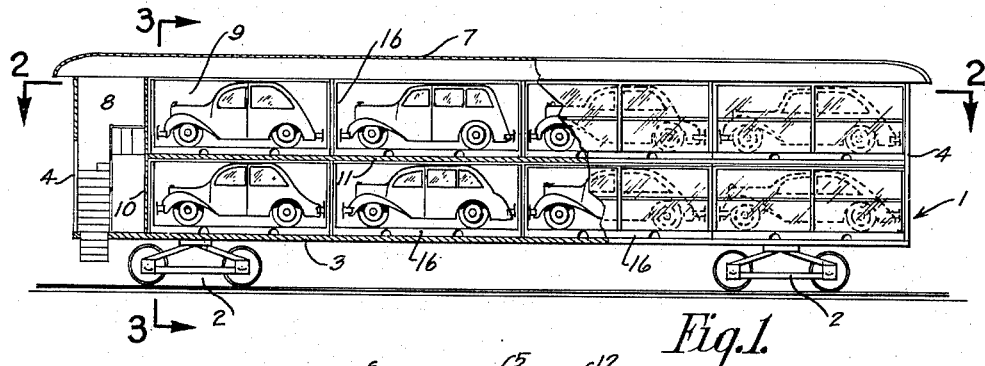
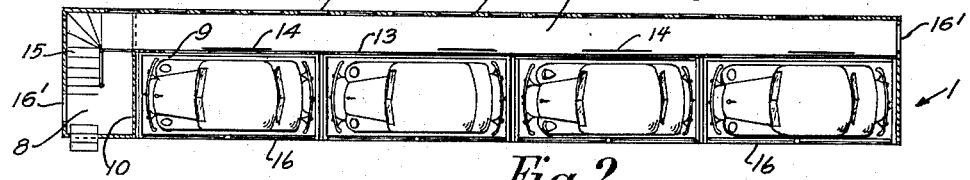
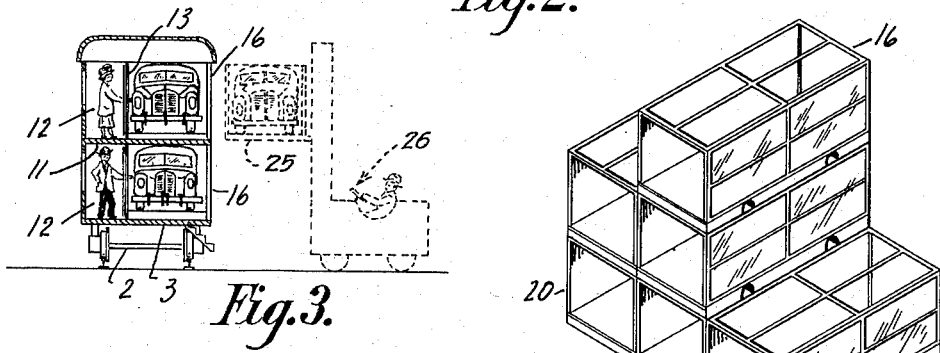
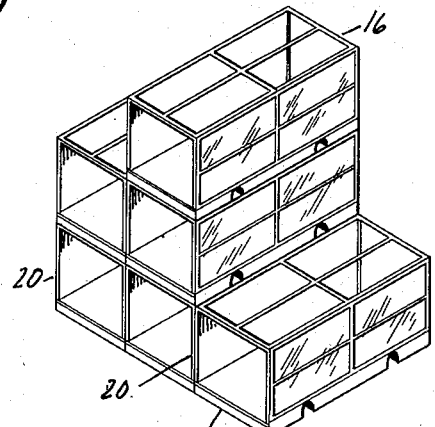
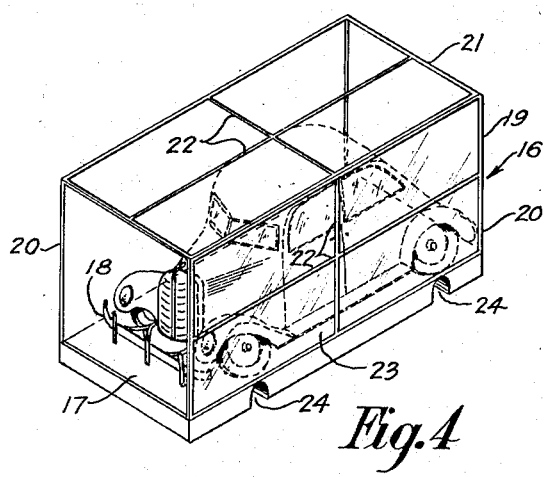
INVENTOR.
ALTON W. HUTSON
BY
A. Schapp
ATTORNEY Patented Oct. 3, 1950

2,524,260

UNITED STATES PATENT OFFICE 2,524,260

MEANS FOR STORING, HANDLING, AND TRANSPORTING MOTOR VEHICLES

Alton W. Hutson, Richmond, Calif.

Application November 4, 1947, Serial No. 784,052

3 Claims. (Cl. 105—340)

The present invention relates to improvements in means for storing, handling and transporting motor vehicles, and its principal object is to provide means for storing a selected number of automobiles in a railway coach of conventional type in such a manner that the entire longitudinal space of the coach is utilized and more automobiles can be accommodated in a single coach than has heretofore been considered possible.

More particularly it is proposed to provide a railroad coach with two floors or decks, the spacing between the floors and between the upper floor and the top structure being such that each floor can accommodate a series of automobiles thereon.

It is further proposed to provide a railroad coach construction in which the automobiles may be introduced from the side throughout the operative length of the coach so that each automobile may be lifted directly to a selected position on either one of the floors. This eliminates the necessity of any maneuvering within the confines of the coach and causes the automobiles to be automatically arranged in longitudinal series, without any waste of space.

It is further contemplated in the present invention to utilize crates for loading the automobiles, the crates being so constructed that an automobile may be driven into a crate under its own power and the crate may then be bodily lifted and moved into its selected place in the coach by straight sidewise motion.

It is a further object of the invention to construct the crates in such a manner that one of the walls of the crate is made to cooperate with the coach in forming a side closure for the latter so that after the coach is completely loaded the respective side walls of the crates form a side wall for the coach and complete the enclosure of the latter.

It is particularly intended, in the present invention, to provide an arrangement whereby the automobile occupants may remain seated in the automobile while the latter is being transported in the coach. Thus, if 8 automobiles are accommodated in a coach and each automobile has four occupants, a total of 32 persons are transported along with the automobiles in a single coach so that the latter combines the features of a freight car with those of a passenger coach.

This is of particular convenience for travelers who wish to tour a distant location without spending much time and effort in driving their automobile to the selected point of interest. If a San Francisco resident, for instance, desires to tour the Atlantic coast, he may load his automobile, with the passengers, in one of the proposed coaches and thus secure transportation to the selected point while the driver and the passengers remain in the automobile. This enables them to reach their destination in the shortest possible time and without the hazard and inconvenience involved in long distance automobile trips.

In furtherance of this idea it is additionally proposed to construct the coach and the crates in such a manner that the passengers enjoy the advantages of sight-seeing and free locomotion through the train in the same manner as regular passengers.

For this purpose the walls of the crates forming the side wall of the coach are made of transparent material so that the occupants of the automobile are free to enjoy the view.

And finally, it is proposed to arrange the crates in such a manner that they may be stacked in parking lots in adjacent tiers to provide individual cages or stalls into which the automobiles may be lifted for parking purposes, whereby the storage space of the parking lot is greatly increased.

Further objects and advantages of my invention will appear as the specification proceeds, and the novel features of my invention will be fully defined in the claims attached hereto.

The preferred form of my invention is illustrated in the accompanying drawing, in which Figure 1 shows a side view of a railway coach with the crates and automobiles disposed therein, a portion of the side walls of the crates removed to disclose the interior, Figure 2, a horizontal section taken along line 2—2 of Figure 1, Figure 3, a transverse section taken along line 3—3 of Figure 1, Figure 4, a perspective detail view, on an enlarged scale, of a crate used to accommodate an automobile, and Figure 5, a stack of crates such as might be used on a parking lot for the storing and parking of automobiles.

While I have shown only the preferred form of my invention, I wish to have it understood that various changes and modifications may be made within the scope of the claims attached hereto without departing from the spirit of the invention.

Referring to the drawings in detail, the coach 1 may embody any suitable construction to serve as a railroad coach, except for the specific features outlined hereinbelow, and is here shown as comprising suitable wheel carriages 2, a main floor 3 supported thereon, end walls 4 rising from the floor, a conventional side wall 5 on one side of the coach, which will hereinafter be referred to as the far side wall and which is equipped with a suitable number of windows 6 and a superstructure 7 of conventional character, which latter may be equipped with suitable ventilating apparatus.

The near side of the coach is substantially open from end to end. A small front compartment 8 is separated from the main storage space 9 by a partition 10. In the main storage space I provide a second elevated floor 11.

The spacings between the two floors and between the upper floor and the top structure are made just sufficient to accommodate the height of the crates to be hereinafter described, and the length of the storage space above each floor is just sufficient to accommodate four crates in end to end relation, so that the total capacity of the coach is eight crates.

The length of the storage space may, of course, be designed for any other multiple of crates, but for present automobile dimensions and practical lengths of coaches four crates is probably about the maximum, and I believe that a capacity of eight automobiles in a single railroad car exceeds any capacity heretofore attained.

It should also be observed that for accommodation of two tiers of automobiles in a coach vertical dimensions have to be carefully calculated since the total permissible height of a railroad car is usually limited by law and by existing conditions. However, there is a general tendency of lowering the height of automobiles and careful calculations have convinced me that my arrangement is feasible and practical at least for some types of automobiles now on the market.

Adjacent the far side wall 5 of the coach I provide an aisle 12 on each floor by using a lengthwise partition 13 spaced from the side wall a suitable distance to allow passengers to pass through the aisle. The partition 13 is suitably windowed or made of transparent material and is provided with a suitable number of sliding doors 14 allowing the automobile doors to be opened and allowing passengers to go in and out. The upper aisle has a staircase 15 leading to the front platform, and suitable door openings 16' are provided in the front and rear walls of the coach to give access to other coaches in the same train.

The main storage space 9 is sufficiently wide to accommodate the width of the crates to be hereinafter described.

One of the crates 16 is shown in detail in Figure 4 and comprises a floor 17, rectangular in form and of a width and length to accommodate an automobile 18 thereon. A frame structure 19 is mounted on the floor and may be made of any suitable construction to form a cage for the automobile. It is here shown as comprising four corner posts 20, a rectangular top frame 21 and suitable reinforcing braces 22. The latter should be arranged to leave the front and the rear of the crate open so as to allow the automobile to be driven in at one end and out at the other end under its own power, and the far side of the crate should be sufficiently open to allow the doors of the automobile to be opened for passengers to go in and out.

The near side wall 23 of the crate is solid and is preferably made of glass or other transparent material to allow occupants of the automobile to view the country therethrough.

The floor of the crate is formed with inverted channels 24 arranged in spaced relation and adapted to receive prongs or skids 25 of a suitable lifting device shown at 26 by means of which the crates may be bodily lifted and loaded upon the respective floors of the coach.

The manner of using my invention will be readily understood from the foregoing description.

For loading, the automobile is driven into the crate, and may be fastened therein by any preferred known fastening means, such as the hold down device disclosed in Patent 1,937,769, of December 15, 1933, to C. Lute. The latter is then lifted, by any suitable loading device, and is transferred to a selected space in the storage compartment of the coach. Since the whole near side of the latter is open, each crate may be moved directly to its selected location by straight sidewise motion and without any maneuvering within the coach. When the crate reaches its proper position, its near wall lines up with the side of the coach and forms part of a side wall for the latter. When all the crates are in position, the near walls of all of them are in alinement and form a complete closure for the near side of the coach. The crates can be fastened to the deck or to partition 13 by any preferred known means, such as the pin and strap means disclosed in Figure 1 of Patent 762,011, of June 7, 1904, to A. Weigand.

The passengers may retain their seats in their respective automobiles while the coach is being transported as part of a train, may enjoy the sight-seeing as if travelling on a highway, and are free to move in and out of the automobile and to take advantage of any conveniences the train may have to offer.

While the invention has been particularly described in connection with railroad coaches and automobiles, it should be understood that the same principles may be applied to airplanes and other types of motor vehicles. It should also be noted that the double floor arrangement and attendant features also lend themselves to the mere transportation of motor vehicles without passengers and may be used, for instance, by the manufacturer to transport motor vehicles to the dealer at less cost than has been practical heretofore.

The near side of the coach has been described as being open from end to end. This is not to be interpreted as meaning that the entire opening is to be clear of all obstacles. It is perfectly feasible, for instance, and within the scope of the present invention, to provide intermediate posts in the near wall spaced sufficiently to provide stalls for the sidewise introduction of the automobile crates and to provide partitions between the stalls, allowing the crates to be moved in and out like drawers in a cabinet. Such modifications are intended to be within the scope of the present invention and are intended to be covered in the term "substantially open" used in the claims. The essential idea of the invention is that a multiple of automobile crates may be introduced into the coach by direct sidewise movement.

Suitable heating and air conditioning apparatus may be used in accordance with standard practice.

My crates may also be used to advantage in parking lots as diagrammatically illustrated in Figure 5. Any number of the crates may be stacked as shown and the automobiles may be moved in and out by means of suitable elevators of conventional construction. This will greatly increase the storage space available, particularly in limited parking areas.

I claim:

1. In means for transporting automobiles, a railroad car having a loading opening at one side the opening extending uninterruptedly from end to end, a plurality of rectangular automobile carrying crates arranged in longitudinal succession in the car and in end to end contact, each of said crates being open at the ends and at one side, a solid transparent wall at the opposite side of each crate, the solid walls of said crates being disposed in alignment longitudinally of the car along the open side to close the car at the open side thereof.

2. In means for transporting automobiles, a railroad car closed at each end, the top and at one side, the opposite side of the car being open for loading, a partition arranged inwardly of and forming an aisle with the closed side of the car and providing a storage space between the partition and the open side, a plurality of automobile containing crates arranged in a longitudinally extending row in the storage space, each of said crates containing an automobile and being open at each end and at one side, a solid transparent wall at one side of the crate, said row of crates being disposed so that the solid walls thereof are aligned along the open side of the car.

3. In means for transporting automobiles and the like, an elongated railroad car having walls closing the ends, the top and one side thereof, the opposite side of the car being open for loading, a partition arranged in said car inwardly of the closed side to provide an aisle therebetween, that part of the car between the partition and the open side providing storage compartments, a series of crates arranged in a longitudinally extending row in the compartments, each of said crates containing an automobile and being open at each end and at one side, a vertical solid wall at one side of the crate transparent to enable occupants of the automobile to view exteriorly of the crate, said solid walls of the crates being disposed in substantial alignment along the open side of the car.

ALTON W. HUTSON.

REFERENCES CITED

The following references are of record in the file of this patent:

UNITED STATES PATENTS

| Number | Name | Date |
| --- | --- | --- |
| 7,371 | Maginn | Oct. 31, 1876 |
| 472,615 | Cooper | Apr. 12, 1892 |
| 982,046 | Flemming | Jan. 17, 1911 |
| 1,086,670 | Jory et al. | Feb. 10, 1914 |
| 1,193,657 | Zeek | Aug. 8, 1916 |
| 1,421,747 | Thompson et al. | July 4, 1922 |
| 1,994,695 | Dolan et al. | Mar. 19, 1935 |
| 2,088,655 | King | Aug. 3, 1937 |
| 2,132,327 | Tatum | Oct. 4, 1938 |
| 2,211,469 | King | Aug. 13, 1940 |
| 2,239,272 | Patton | Apr. 22, 1941 |